US008868626B2

(12) United States Patent
Iftode et al.

(10) Patent No.: US 8,868,626 B2
(45) Date of Patent: Oct. 21, 2014

(54) SYSTEM AND METHOD FOR CONTROLLING A FILE SYSTEM

(75) Inventors: Liviu Iftode, Princeton, NJ (US); Stephen Smaldone, Monroe Township (NA); Aniruddha Bohra, Monmouth Junction (NA)

(73) Assignee: Rutgers, The State University of New Jersey, New Brunswick, NJ (US)

(*) Notice: Subject to any disclaimer, the term of this patent is extended or adjusted under 35 U.S.C. 154(b) by 1080 days.

(21) Appl. No.: 12/102,672

(22) Filed: Apr. 14, 2008

(65) Prior Publication Data

US 2009/0043823 A1 Feb. 12, 2009

Related U.S. Application Data

(60) Provisional application No. 60/923,097, filed on Apr. 12, 2007.

(51) Int. Cl.
*G06F 12/00* (2006.01)
*G06F 17/30* (2006.01)

(52) U.S. Cl.
CPC ................ *G06F 17/3007* (2013.01)
USPC ........................... 707/822; 707/825

(58) Field of Classification Search
CPC ............... G11B 2220/2562; G11B 27/105; G11B 27/329; G11B 27/034; H04N 9/8205; H04N 9/8042; H04N 5/85; H04N 9/8063; G06F 19/22; G06F 19/28; G06F 11/3409; G06F 17/30241; G06F 17/30528
See application file for complete search history.

(56) References Cited

U.S. PATENT DOCUMENTS

| 6,606,685 | B2 | 8/2003 | Huxoll | |
|---|---|---|---|---|
| 6,915,457 | B1* | 7/2005 | Miller | 714/43 |
| 7,120,631 | B1 | 10/2006 | Vahalia et al. | |
| 2003/0176994 | A1* | 9/2003 | Spitz et al. | 703/27 |
| 2004/0101281 | A1* | 5/2004 | Defrance et al. | 386/69 |
| 2005/0076041 | A1* | 4/2005 | Stakutis et al. | 707/100 |

(Continued)

OTHER PUBLICATIONS

M. Zhao, e t al., "Proxy Managed Client-Side Disk Caching for the Virtual File system", Technical Report TR-ACIS-04-00 I, Electrical and Computer Engineering-University of Florida., Nov. 2004.

(Continued)

*Primary Examiner* — Tony Mahmoudi
*Assistant Examiner* — Tuan A Pham
(74) *Attorney, Agent, or Firm* — Winstead PC

(57) ABSTRACT

According to various embodiments of the invention, a system and method for controlling a file system. In some embodiments, a control plane interposes between a data plane user and a data plane, intercepts file system operations, and performs control plane operations upon the file system operations. In one such embodiment, the system and method is implemented between a data plane user that is a local file system user and a data plane that is a local file system. In another such embodiment, the system and method is implemented between a data plane user that is a client and a data plane that is a file server. Furthermore, for an embodiment where the control plane that interposes between a client and a file server, the control plane can be implemented as a file system proxy. Control plane operations include, but are not limited to, observation, verification, and transformation of a file system operation.

19 Claims, 15 Drawing Sheets

(56) References Cited

U.S. PATENT DOCUMENTS

| | | | |
|---|---|---|---|
| 2005/0273858 A1* | 12/2005 | Zadok et al. | 726/24 |
| 2006/0161966 A1* | 7/2006 | Nagampalli et al. | 726/1 |
| 2006/0259949 A1* | 11/2006 | Schaefer et al. | 726/1 |
| 2007/0083570 A1* | 4/2007 | Fineberg | 707/203 |
| 2008/0077988 A1* | 3/2008 | Small | 726/22 |

OTHER PUBLICATIONS

R. Figueiredo, et al., "The PUNCH virtual file system: seam less access to decentralized storage services in a computational grid", Proceedings of the 10th IEEE International Symposium on High Performance Distributed Computing, 2001.

* cited by examiner

SYSTEM AND METHOD FOR CONTROLLING A FILE SYSTEM

CROSS REFERENCE TO RELATED APPLICATION

This application claims the benefit of U.S. Provisional Application Ser. No. 60/923,097, entitled "FileWall: An Architecture for Controlling Access to Network File Systems," filed on Apr. 12, 2007.

DESCRIPTION

1. Field of Invention

The present invention relates to file systems, and more particularly, some embodiments relates to a system and method for controlling a file system.

2. Description of the Related Art

File management has traditionally been split between file owners and file system administrators. Owners typically manage file organization, naming, and protection, while administrators control file system configuration, backup and recovery, hardware and performance, disk space, and other responsibilities. As file systems grow in size, complexity, and criticality, managing them has become increasingly complex both for file owners and file system administrators. This is why, significant research and software development effort has been devoted to simplify file management. For file owners, tools like desktop search, semantic file systems, stackable file systems, etc., have been developed. For administrators, tools for improved backup and recovery, interposed request routing, union file systems, and federated file systems have simplified file system management.

In addition to simplifying file management, most organizations expect their system administrators to implement organization-wide disciplines to control the way their file systems are accessed. Information Lifecycle Management (ILM) and intrusion monitoring are two examples of such disciplines. ILM directs how long and on what media files are to be kept in order to protect data while complying with evolving government regulations (e.g., Sarbanes Oxley). Intrusion monitoring attempts to detect unauthorized access to data.

Currently, file systems are designed for the least common denominator of functionality, across all deployments to enable widespread use across diverse client systems. This, unfortunately, makes it difficult to deploy policies and file system extensions that allow for monitoring, validation, and modification file system access, especially in the client-server area.

Extending network file systems has previously been accomplished by modifying: (i) clients (e.g., to modify the file read-ahead policy, to implement virtualized namespaces, etc.) and (ii) servers (e.g., to implement virus protection, to provide data encryption, etc.). Unfortunately, since these mechanisms require modifications to clients and servers, they are intrusive and complicated to implement.

Recent developments of stackable file systems have provided a platform and a language for easily extending file systems to implement a spectrum of policies (e.g. intrusion detection, file system tracing, fine-grained access control, data and metadata versioning, etc.). However, such file systems require some modification to implement the stackable file system. In addition, while the stackable file system is an option for local file system policies and extensions, using such a stackable file system to implement network file system policies remains a challenge. That is because network file systems utilize network file system protocols and transport protocols, both of which have their own semantics. Hence, when a file system extension or policy makes modifications to the messages and flows over the network, such modification cannot be arbitrary and must adhere to the semantics of certain protocols (e.g. NFS, TCP, UDP). In addition, any modification to messages and flows must not generate inconsistent or incorrect data while operating on file system operations.

Therefore, file access policies and extensions based on file attributes (e.g., permissions, access control lists, etc.) can only be simplistic and static, leaving most of the control at the discretion of the file owner, especially for network file systems. Furthermore, from the administrator's perspective, file access policies are difficult, if not impossible, to impose. Administrators have no simple way to define file access policies based on dynamic access information (e.g. a file cannot be accessed more than 100 times by the same user within the same session, access to an important file is allowed only between 9 AM and 10 AM, etc.). Complex policies for quality of service (QoS) or forensic analysis are even harder to impose.

BRIEF SUMMARY OF EMBODIMENTS OF THE INVENTION

According to various embodiments of the invention, a system and method for controlling a file system is provided. In some embodiments, a control plane interposes between a data plane user and a data plane, intercepts file system operations, and performs control plane operations upon the file system operations. In one such embodiment, the system and method is implemented between a data plane user that is a local file system user and a data plane that is a local file system. In another such embodiment, the system and method is implemented between a data plane user that is a client and a data plane that is a file server. Furthermore, for an embodiment where the control plane that interposes between a client and a file server, the control plane can be implemented as a file system proxy. Control plane operations include, but are not limited to, observation, verification, and transformation of a file system operation. Possible transformations include, but are not limited to, attribute transformations, flow transformations, and flow coordination.

In one embodiment the control plane intercepts the file system operation. The control plane performs one or more control plane operations on the intercepted file system operation. Once the control plane operations have completed, the control plane forwards the file system operation to a destination determined by the control plane. In some embodiments, the file system operation intercepted is either a file system request or a file system response. In some of these embodiments, the request originates from a data plane user and the response originates from a data plane.

In another embodiment, the control plane performs control plane operations on the file system operation by the following: analyzing the file system operation; identifying an extension chain applicable to the file system operation; invoking the first extension in the extension chain; passing the file system operation to the first extension; performing one or more control plane operations on the file system operation according to the first extension; and finally outputting the now processed file system operation. When the processed file system operation is outputted, it is either sent from the control plane to a destination outside the control plane, sent to the next extension in the extension chain, or discarded. An extension chain comprises of one or more extensions. Each extension defines the behavior of the control plane when it intercepts a file system operation. Specifically, in some embodiments the extension has sections of instructions for configuration of the control plane, receiving of file system operations, and sending of file system operations.

In yet another embodiment, the control plane utilizes a persistent state storage for control plane operations. In some of these embodiments, the persistent state storage stores a static context and a dynamic context. The static context is a read-only state while the dynamic context is a generated state which can be updated by extensions. The control plane executes the extensions in view of both the static context and the dynamic context stored in the persistent state storage. In further embodiments, the control plane uses a control plane engine (also known as an execution engine) to execute extensions.

In another embodiment, the data plane user is a client, the data plane is a file server, the control plane is a file system proxy, and the file system operation comprises a network file system protocol. In other such embodiments, when a file system operation is acted upon by a control plane operation, the control plane operation preserves the network file system protocol. In yet other such embodiments, when a file system operation having a first protocol is acted upon by a control plane operation, the control plane operation transforms the first protocol to a second protocol.

In yet another embodiment, the invention described herein can be used for file system administration. File system administration includes, but is not limited to, monitoring of a file system, access control of a file system, maintenance of a file system, and semantic extensions for a file system.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention relates to file systems, and more particularly, some embodiments relates to a system and method for controlling a file system. In yet other embodiments, a system and method for controlling a file system by interposing a control plane between a data plane user and a data plane.

Figure 14:
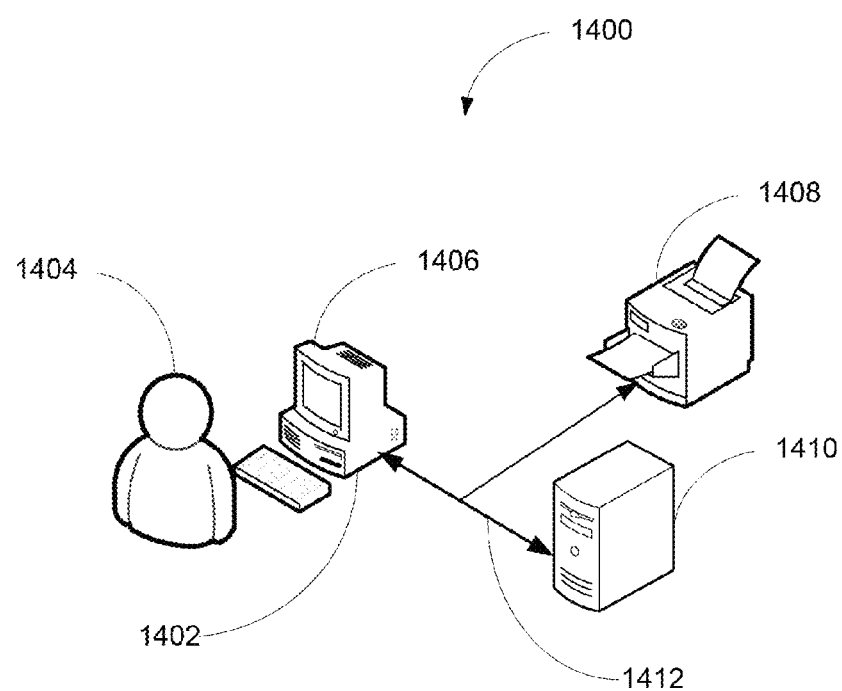
FIG. 14 is a diagram illustrating an example environment in which the systems and methods described herein can be implemented.

Before describing the invention in detail, it is useful to describe an example environment with which the invention can be implemented. One such example is illustrated in FIG. 14. FIG. 14 depicts a client system 1400 that can be used by a user 1404 access either the local file system or a file system residing on a file server 1410. System 1400 can include a computer 1402 and a monitor 1406. The computer can be a laptop computer, desktop computer, handheld computer, mainframe computer, etc. Any computing system capable of running software implementing the systems and methods described herein can be used. Monitor 1406 can be a CRT, flat screen, etc.

The user 1404 (or designer) can access the local file system residing on the computer 1402 using various peripherals such as a mouse, keyboard, track ball, etc. If computer 1402 is a mainframe, designer 1404 can access computer 1402 using, for example, a dumb terminal. Additionally, computer 1402 can be connected to a printer 1408 and a server 1410 using a network 1412. Server 1410 can, for example, be used to store data on its file system. The user 1404 (or designer) can access the file system residing on the server 1410 through the computer 1402 over the network 1412. In one embodiment software implementing the systems and methods described herein can be stored on a hard drive in server 1410. Thus, the software can be run from the hard drive in server 1410. In another embodiment software implementing the systems and methods described herein can be stored on a hard drive in computer 1402. Thus, the software can be run from the hard drive in computer 1402. Therefore, in this embodiment, the software can be used weather or not computer 1402 is connected to network 1412. In yet another embodiment printer 1408 can be connected directly to computer 1402. Thus, computer 1402 can print whether or not it is connected to network 1412.

Computers 1402, servers 1410, printers 1408, and computer networks 1412 are well known. Therefore, for the sake of brevity, other example environments will not be discussed. It will, however, be apparent to those of skill in the art that the systems and methods described herein can be used in conjunction with many different environments. Additionally, a computer system 1300 will be discussed in more detail with respect to FIG. 13. Computer system 1300 can be the same as or similar to computer 1402.

From time-to-time the present invention is described herein in terms of the example environment. Description in terms of the environment is provided to allow the various features and embodiments of the invention to be portrayed in the context of an exemplary application. After reading this description, it will become apparent to one of ordinary skill in the art how the invention can be implemented in different and alternative environments.

Figure 1:
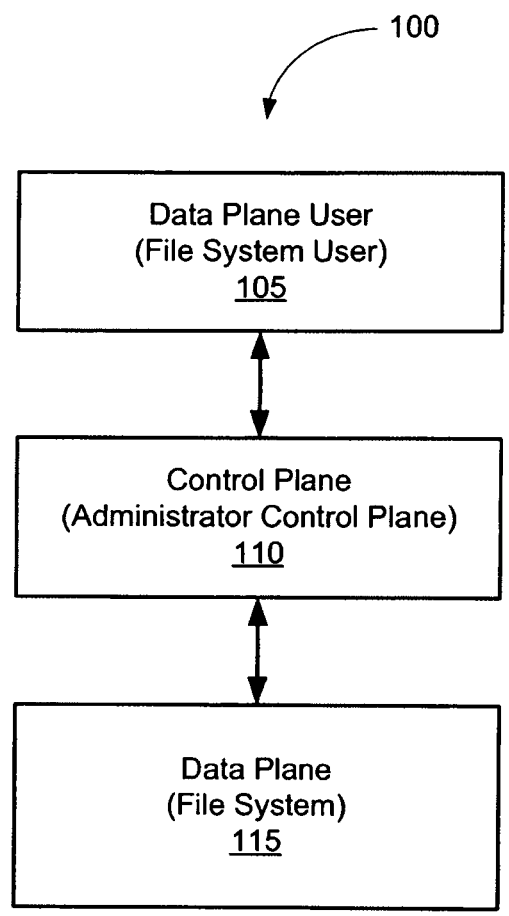
FIG. 1 is a diagram illustrating an example system of the present invention.

According to various embodiments of the invention, a system and method for controlling a file system is provided. In some embodiments, a control plane interposes between a data plane user and a data plane, intercepts file system operations (also known as a file system message), and performs control plane operations upon the file system operations. FIG. 1 is a diagram illustrating an example system of the present invention. The example system 100 includes a data plane user 105, control plane 110, and data plane 115. In some embodiments, the data plane user 105 is a file system user and the data plane 115 is a file system. In between the data plane user 105 and data plane 115 is the control plane 110 which interposes on the data path between the data plane user 105 (file system user) and the data plane 115 (file system). The control plane 110 provides the data plane user 105 a separate path to the data plane which intercepts file system operations that are exchanged between the data plane user 105 and the data plane 115. Through interposition, it is possible for the control plane 110 to be non-intrusive as possible to the data flow since little to no modification is required to implement the control plane 110 into an existing system. This is especially true for interposition where the data path between the data plane user 105 and data plane 115 is a network, which is later described in more detail in FIGS. 7 and 8.

Figure 5:
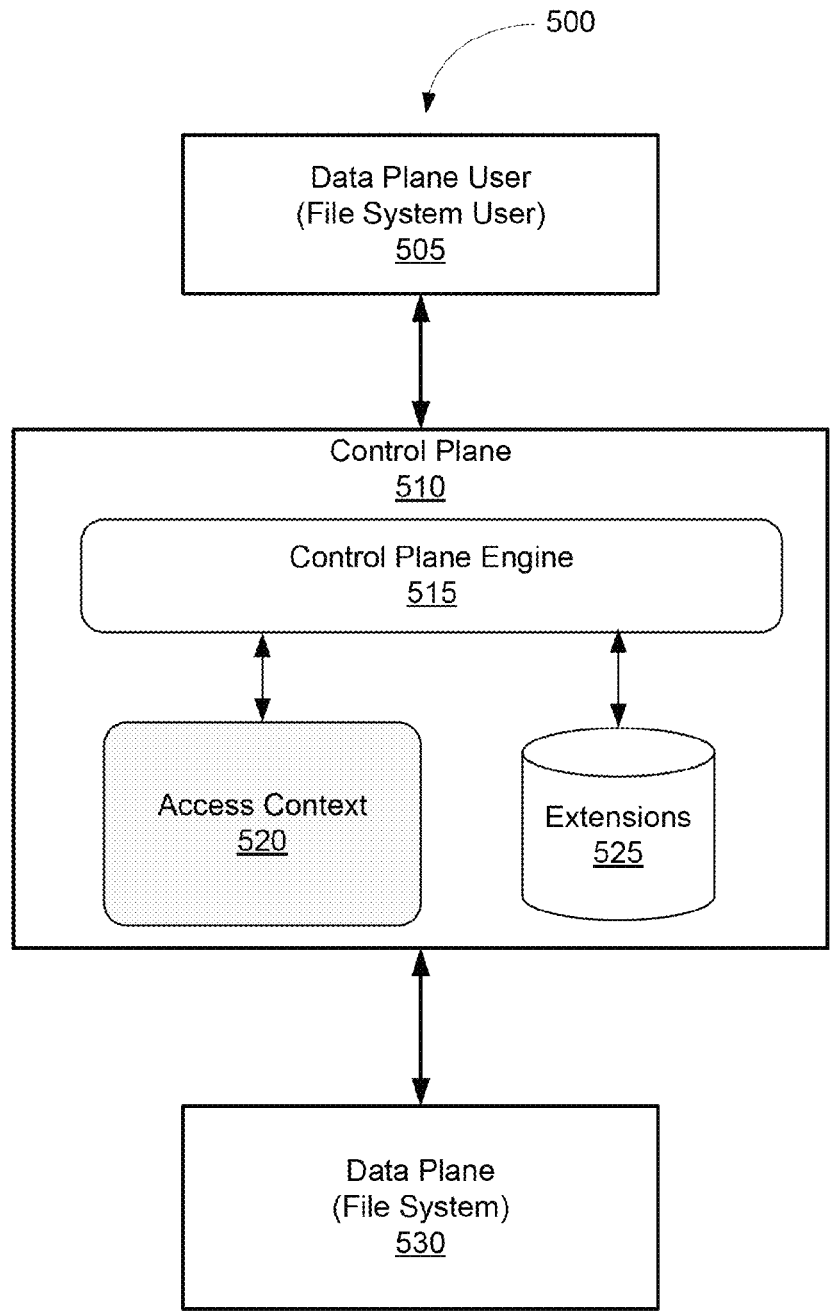
FIG. 5 is a diagram illustrating an example implementation of the present invention in generic form.

Once the control plane 110 is interposed between the data plane user 105 and the data plane 115 and the data plane user 105 is configured to request and receive file system operations through the control plane 110, all file system operations are intercepted by the control plane 110. In such an embodiment, the control plane 110 can mediate the interaction of file operations between the data plane user 105 and the data plane 115. The control plane 110 has the ability to perform control plane operations upon the file system operations as they pass through the control plane 110. Examples of control plane operations include, but are not limited to, observing, verifying and transforming the file system operation. In some embodiments, these control plane operations are defined within extensions 525, such as the one in FIG. 5. FIG. 5 is a diagram of an example implementation of the present invention and discussed later in further detail. In further embodiments, these extensions 525 are invoked and executed using a persistent state storage (access context 520). A persistent state storage is also discussed later in further detail in FIG. 5.

In some embodiments, the control plane operations represent the minimal set of functionality supported by the control plane 110 through extensions 525. Observation of file system operations does not modify the file system operation, but, simply, observes the file system operation as it passes through the control plane 110. Verification and transformation of the file system operation, on the other hand, has the ability to modify the file system operation as it flows through the control plane 110. Hence, in some embodiments, the control plane 110 through the extensions 525 provides three types of transformation operations: attribute transformation, flow transformation, and flow coordination.

File system operations are constructed as a set of arguments in file system requests and responses. An attribute transformation operation allows the control plane 110 to modify these attributes as they flow through the control plane 110. As a result, the attribute transformations affect the action performed at either end (data plane user 105 or data plane 115). Attribute transformation operations include, but are not limited to, attribute remapping, operation modification, and argument transformation.

With attribute remapping, the control plane 110 can add a layer of indirection between the data plane user 105 and data plane 115. In some cases, the control plane 110 modifies the visible attribute of a file system operation originating from the data plane user (105) before it is presented to the data plane 115. In other cases, the data plane's (115) response is modified to remap the attributes before the response reaches the data plane user 105. For example, attribute remapping enables the control plane 110 to transform a file system protocol A (e.g. NFS) found within a file system operation to a file system protocol B (e.g. CIFS). In contrast, with operation modification, the control plane 110 can transform the operations within the file system operation. In some cases, this allows the control plane 110 to transform the data plane user's (105) requests to execute different functionality. This also allows the control plane 110 to transform the data plane's (115) responses to match the data plane user's (105) original request. Finally, argument transformation allows the control plane 110 to modify any part of the file system operation. Examples of arguments include, but are not limited to, updates (writes) and queries (reads).

Flow transformation modifies a flow in a file system. A flow in a file system represents a channel where all file system operations are exchanged between a data plane user 105 (i.e. user) and a data plane 115 (i.e. file system). In terms of an embodiment of the present invention, this flow passes through the control plane 110. In some embodiments, the flow transformation modifies the file systems behavior by using file system operation filtering, reordering, and injection.

With file system operation filtering, the control plane 110 can prevent a file system operation sent by one end of the flow (e.g. data plane user 105) from being received at the other end (e.g. data plane 115) by removing the file system operation. In some embodiments, such a transformation is useful in implementing access control and security policies through extensions, where only messages representing permitted operations are forwarded to the data plane 115 and all other messages are removed from the flow.

With file system operation reordering, the control plane 110 both filters out file system operations in the flow and introduces additional file system operations into the flow. In an embodiment where the data plane user 105 and data plane 115 exchange file system operations over a network, a network file system protocol is usually utilized. In order for the exchange of file system operations to continue in such an arrangement, the protocol must be preserved during the flow.

For instance, a file system request operations in such a context usually requires a file system response operation be returned. Therefore, for every file system request operation filtered out by the control plane 110 (e.g. data plane user's request to the data plane is filtered out), the control plane 110 must inject into the flow a response operation to the sender (e.g. inject response back to data plane user) in order to maintain network protocol semantics. The control plane 110 achieves this with file system operation reordering.

With file system operation injection, the control plane 110 can modify the sequence of file system operations within the flow. As discussed above, file system operation injection allows the control plane 110 to inject additional file system operations into the flow. In some embodiments, the injection of additional file system request operations could be utilized by the control plane 110 to retrieve information state information from the data plane, for example.

The last transformation operation to be discussed, flow coordination, enables the control plane 110 to transform file system operations across a collection of flows. Flow coordination allows for multiplexing and demultiplexing of flows. Multiplexing (or fan-in) operations operate on a collection of flows and generates a single flow of messages delivered to the client (data plane user 105) or the server (data plane 115). On the other hand, demultiplexing (or fan-out) operations separate a single flow of messages into multiple flows. In some embodiments, multiplexing may be used to implement novel consistency semantics by controlling the sequence of messages across flows. For example, atomic updates may be implemented by serializing all operations performed on a file system object or a group of objects, etc. Demultiplexing, may be used in some embodiments to implement file server (data plane 115) replication, where multiple flows are generated, one for each server replica, from a single client (data plane user 105) to server (data plane 115) flow. Each request must be replicated using fan-out and the responses combined using fan-in The interception of a file system operation by a control plane capable of the transformation operations listed thus far enables the implementation of several different administrative tasks for file systems. Examples of these administrative tasks include, but are not limited to, monitoring, access control, maintenance, and semantic extensions.

In regards to monitoring, the control plane 110 provides a monitoring framework for administrators where the control plane 110 performs only attribute extraction and state updates. The purpose of this would be to collect per-client/per-server statistics about the messages flowing between the clients (data plane users 105) and servers (data planes 115).

In terms of access control, the control plane 110 enables extension of the traditional read-write-execute access control framework provided by traditional file systems. Implementation of control plane 110 allows definition of alternative file access control policies. Examples of this include, but are not limited to, fine-grained and temporal access control policies, which allow or deny requests based on the control plane's (110) configuration, network identity, and current access time. This class includes admission control policies, which allow or deny requests based on the server (data plane 115) load determined by the number of pending requests, server response latencies, etc.

For maintenance, administrators can configure control plane 110 to implement security, client transparent failover, admission control, and extension policies. For example, a file handle security extension can be implemented, which generates per-client (data plane user 105) virtual file handles and stores a mapping between the virtual and real (server generated) file handles. The purpose of this extension is to add an additional layer of security. Server (data plane 115) generated file handles typically reveal information about the server, such as operating system version and date of file system creation; this information can be filtered out by the control plane 110 for security purposes. Another example is a policy that implements client transparent failover, where server (data plane 115) replicas are maintained by generating requests to multiple servers and responding to the client (data plane user 105) using the identity of the currently designated primary replica. Yet another policy that can be implemented includes indirection in mapping the physical or server (data plane 115) generated object identifiers (file handles) to virtual or client (data plane user 105) visible file handles. This indirection allows a policy to dynamically map requests to the appropriate server identifiers.

Lastly, in terms of semantic extensions, implementation of control plane 110 allows extensions of the file system interface or modification of the semantics of the file system access (e.g. virtual namespaces for file systems, allowing users on-line mechanisms to sort through the many files they own to find desired files quickly). Other policies include consistency and atomicity semantics beyond those supported by the underlying file system. These policies can, for example, implement update consistency across multiple files or directories or support multiple versions of the same file.

Figure 2:
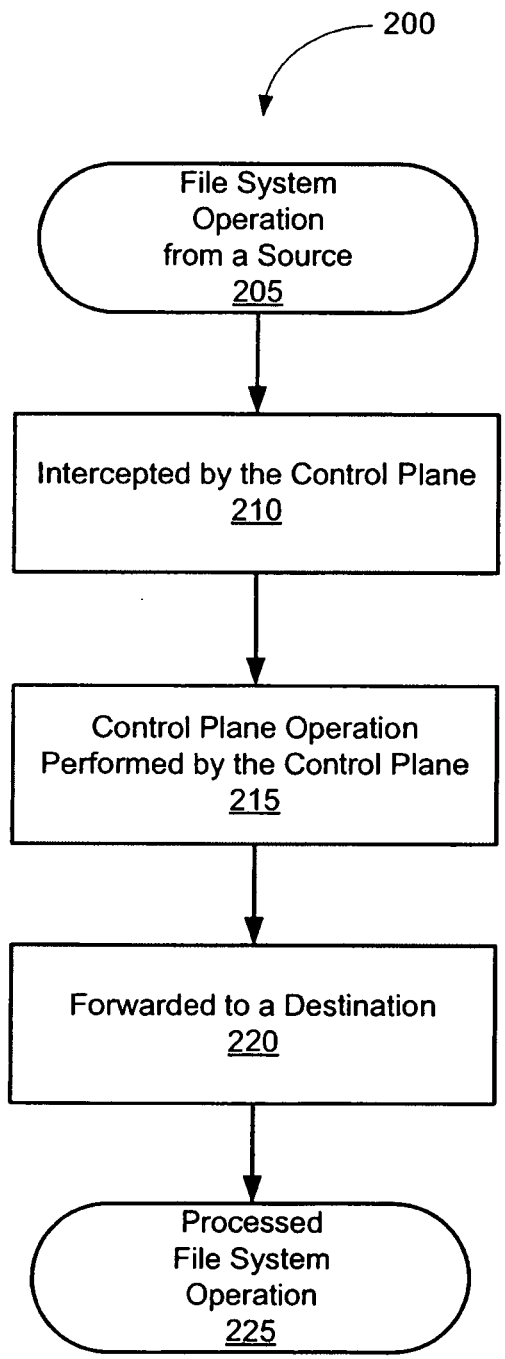
FIG. 2 is a flowchart illustrating an example method of intercepting a file system operation from a source, performing a control plane operation upon the file system operation, and forwarding the file system operation to a destination.

FIG. 2 is a flowchart illustrating an example method of intercepting a file system operation from a source (205) at 210, performing a control plane operation upon the file system operation at 215, and forwarding the file system operation to a destination at 220. In some embodiments, this method is performed by the control plane 110. Once the file system operation has been forwarded to a destination at 220, the file system operation is now regarded as a processed file system operation 225. In some embodiments, the type of control plane operation performed at 215 includes, but is not limited to, observing, verifying, and transforming the file system operation. Note that file system operations are also known as file system messages. In one type of embodiment, method 200 is run within the control plane 110.

Figures 3A, 3B:
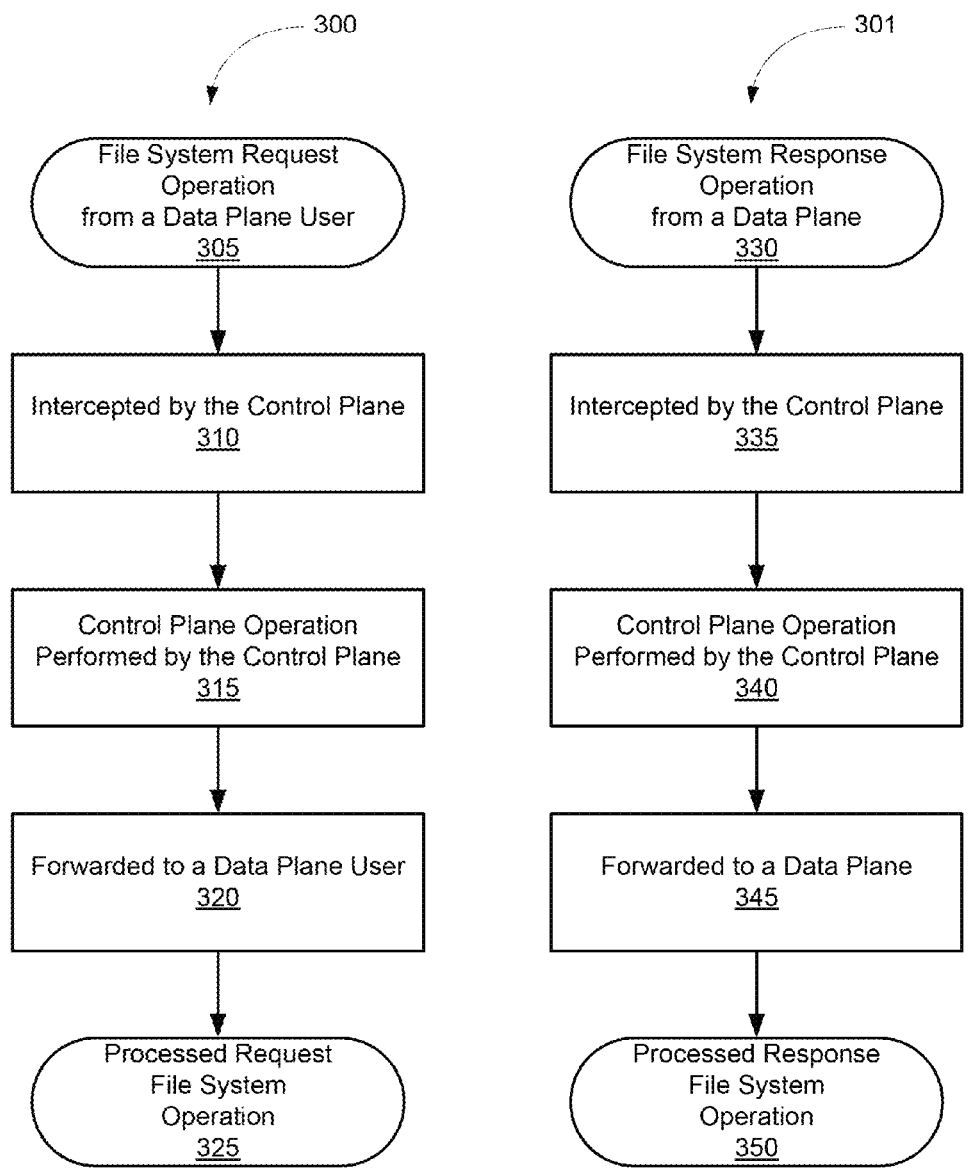
FIG. 3a is a flowchart illustrating an example method of intercepting a file system request.
FIG. 3b is a flowchart illustrating an example method of intercepting a file system response.

FIG. 3a is a flowchart illustrating an example method of intercepting a file system request. The method 300 intercepts the file system request operation 305 from a data plane user at 310, performs a control plane operation upon the file system operation at 315, and forwards the file system operation to a destination at 320. At 320 method 300 then outputs the processed request file system operation 325. Like method 200, method 300 also runs within the control plane 110 in some types of embodiments of the invention.

FIG. 3b is a flowchart illustrating an example method of intercepting a file system response. The method 301 intercepts the file system response operation 330 from a data plane at 335, performs a control plane operation upon the file system operation at 340, and forwards the file system operation to a destination at 345. At 345 method 301 then outputs the processed response file system operation 350. Like method 200, method 301 also runs within the control plane 110 in some types of embodiments of the invention.

Figure 4:
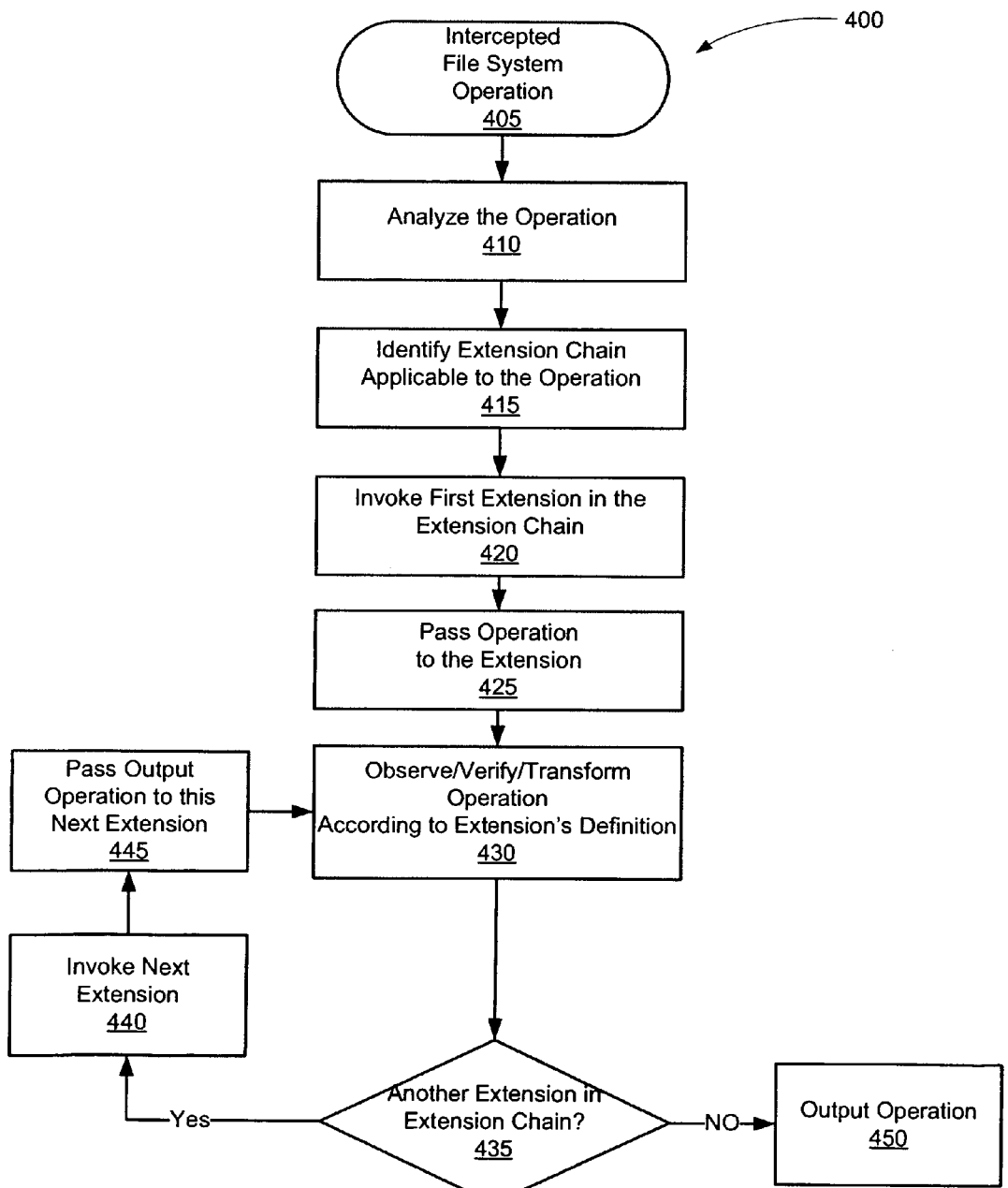
FIG. 4 is a flowchart illustrating an example method used by a control plane to perform a control plane operation on an intercepted file system operation.

FIG. 4 is a flowchart illustrating an example method used by a control plane to perform a control plane operation on an intercepted file system operation. The method 400 begins at 410 where the intercepted file system operation 405 is analyzed in order to identify the extension chain applicable to the operation at 415. In some embodiments, an extension chain contains one or more extensions. As noted earlier, extensions in some embodiments define and control the behavior of the control plane 110 when the control plane 110 intercepts a file system operation. Usually, a single extension in such embodiments is defined by a file system administrator and is considered one unit of processing for the control plane 110 since it executes independently. This allows for such extensions to either be primitive, where the functionality is self-contained, or be composite, where multiple primitive extensions are connected in a chained sequence of execution (i.e. an extension chain).

At 420, the first extension in the applicable extension chain is invoked and executed by the control plane 110 and passed the file system operation at 425. The extension then observes, verifies, or transforms the file system operation (430) based on the extension's definition. If another extension exists in the extension chain (435), this next extension is invoked at 440, passed the file system operation outputted from the last extension at 445, and this next extension then observes, verifies, or transforms the file system operation (430) according to its definition. However, if another extension does not exist, the file system operation is outputted from the control plane 110 at 450. This outputted file system operation is regarded as a processed file system operation. Outputting the file system operation at 450 includes, but is not limited to, sending it to the data plane user 105, sending it to the data plane 115, or discarding the file system operation.

FIG. 5 is a diagram illustrating an example implementation of the present invention in generic form. Similar to FIG. 1, there is a data plane user 505 (also known as the file system user), the control plane 510, and the data plane 530 (also known as the file system). In some embodiments of the invention, control plane 510 comprises of a control plane engine 515, an access context 520, and extensions 525. As discussed earlier, the extensions 525 define and control the behavior of the control plane (110 & 510) when the control plane 510 intercepts a file system operation.

The access context 520 provides a persistent state storage that maintains access history and environment information as the control plane operates according to an executing extension. In some embodiments, access history comprises of a sequence of file system operations in a given file system session. An example of a session includes, but is not limited to, a sequence of file system operation upon a single file. In regards to environment information, the information comprises of both information external to the file system (e.g. time, date) and information internal to the file system (e.g. statistics like access counts, rate of operations, current file name, current file handler, file operation type). In some embodiments, environment information is maintained per session and updated on each file system operation. In further embodiments, extensions can setup and maintain variables within the environment information.

An example implementation of the access context 520 comprises of two components: static context and dynamic context. The static context is a read-only and stores a state that is not updated during executions. Examples of what the static context stores include, but are not limited to, user identifiers, list of file servers, and servers' authentication keys. The dynamic context, on the other hand, store a state that can both be read from and be written to during execution. Extensions can both generate and update the state as they run. The dynamic context is where, for example, an extension could store setup and store variables during the extension's execution.

In addition, the access context 520 can optionally choose to store itself in memory rather than persistent storage (e.g. a database). A tree data structure is just one form in which the access context could be stored within memory or persistent storage. For example, a file run, which is a collection of access to a file, can be stored in such a tree data structure. A file run starts at the first time a file is accessed and ends when an end of file is seen or the time elapsed since the start is greater than a given threshold.

The control engine 515 (also known as the execution engine) executes the extensions 525 as they are invoked by the control plane. In some embodiments, the control engine 515 can either execute a single extension or a chain of extensions. When a chain of extensions (extension chain) is executed, each extension within the chain is invoked exactly once. In some cases, the extension is invoked once for a file system request operation and once for the corresponding file system response operation. Infinite loops during extension chain execution can be avoided in some embodiments by preventing skipping of extensions within the chain. Once an extension in the extension chain is invoked, if it is the first in the chain, it will be passed the file system operation the control plane 510 intercepted. If, however, the invoked extension was in the middle or the end of a chain, the extension would receive the file system operation outputted from the previous extension in the chain. Once the extension at the end of the chain has completed execution, the file system operation is outputted from the control plane 510. In some embodiments, an extension has the option of discarding the file system operation rather than outputting it to the next extension or outputting it from the control plane 510.

There are particular embodiments where the control plane engine 515 executes an extension against the information contained in the access context 520. In such embodiments, as an extension is being executed by the control plane engine 515, the extension can store and retrieve information contained in the access context 520. This information is used by the extension to determine the extension's actions.

Figure 6:
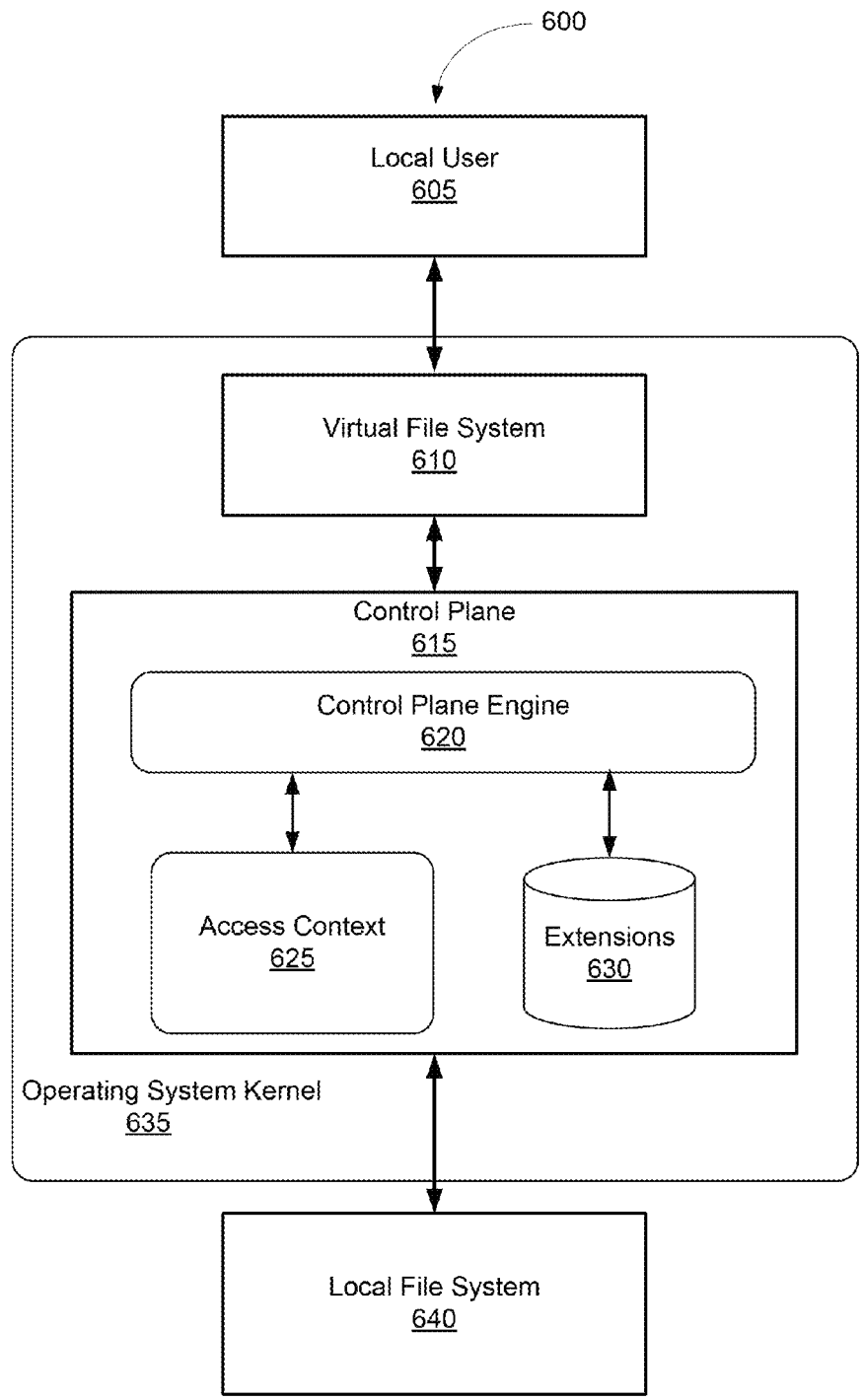
FIG. 6 is a diagram illustrating an example implementation of the present invention for a local user and local file system.

FIG. 6 is a diagram illustrating an example implementation of the present invention for a local user and local file system. The data plane user is a local user 605, the data plane is a local file system 640, and a virtual file system 610 is the data path between the local user 605 and the local file system 640. Interposed upon this data path is the control plane 615, which has components (control plane engine 620, access context 625, and extensions 630) similar to those of the control plane 510. In this example implementation, however, the control plane 615 intercepts file system operations as they are sent to and from the local file system 640. Specifically, in this example the control plane intercepts the file system operations from within the operating system kernel 635 (e.g. control plane implemented as a dynamically loaded kernel module or compiled into the kernel). There also exist embodiments where the control plane intercepts file system operation from outside the operating system kernel (e.g. middleware software). An example of a local user 605 includes, but is not limited to, a local user account. In some embodiments, there can be more than one local user 605 simultaneously interacting with the control plane 615 through the virtual file system 610. An example of a local file system includes, but is not limited to, a modern file system format (e.g. NTFS, EXT3). The local user 605 interacts with the control plane 615 by exchanging file system operations through a virtual file system 610. The virtual file system 610 resembles an actual file system to the local user 605; in some embodiments, the virtual file system 610 is presented by the control plane 615.

Figure 7:
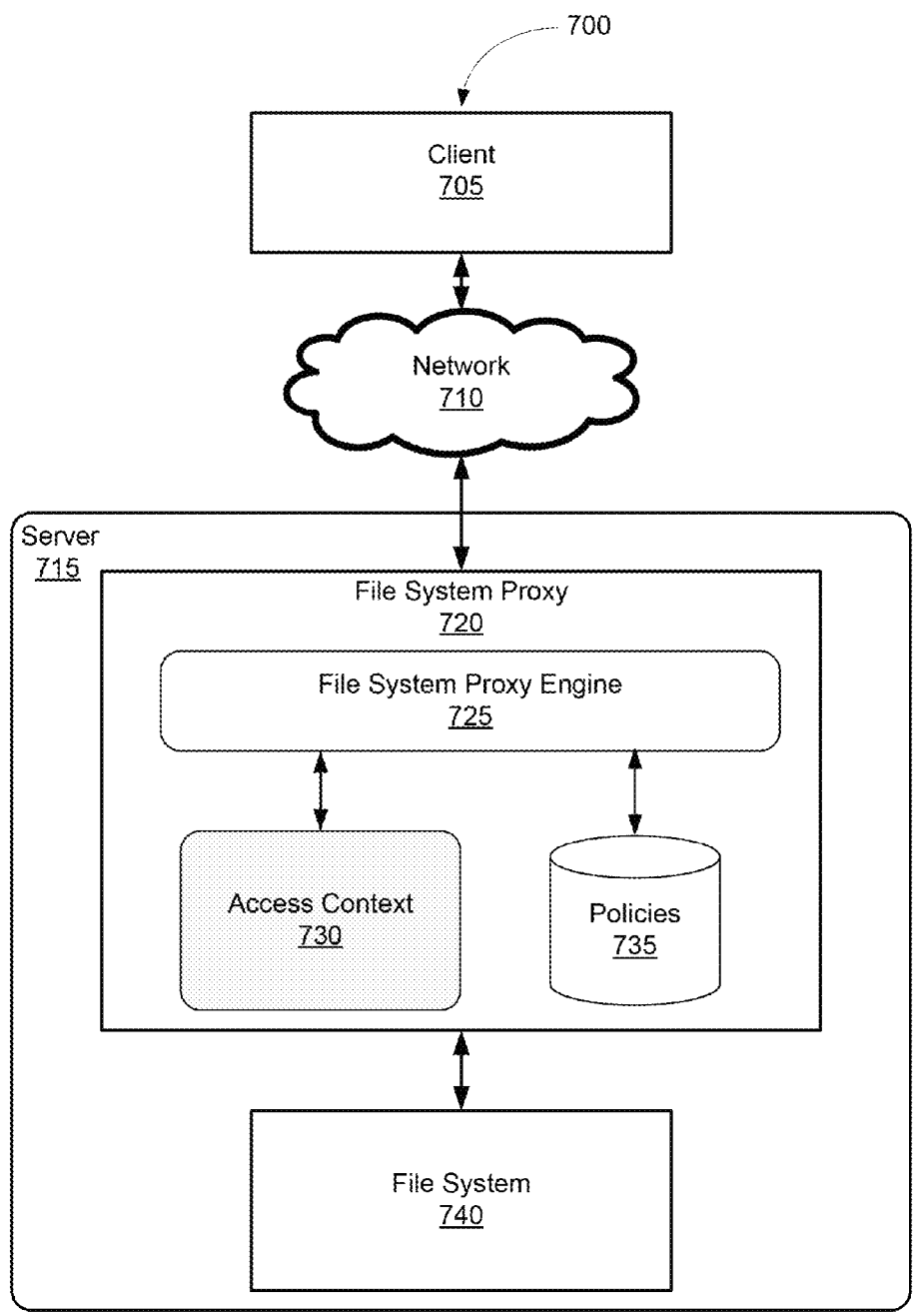
FIG. 7 is a diagram illustrating an example implementation of the present invention for a client and a server.

FIG. 7 is a diagram illustrating an example implementation of the present invention for a client and a server. The data plane user is a client 705, the data plane is a file system 740 residing on a server 715, and a network 710 is the data path between the client 705 and the server 715. Interposed upon this data path is the file system proxy 720, which resides on the server 715 and has components (file system proxy engine 725, access context 730, and policies 735) similar to those of the control plane 510 (the file system proxy engine 725 is similar to a control plane engine 515 and the policies 735 is similar to extensions 525). An example of the client 705 includes, but is not limited to, a computer workstation or laptop computer residing on the network 710. An example of the server 715 includes, but is not limited to, a file server and a computer sharing its local file system over the network 710. In some embodiments, there can be more than one client 705 simultaneously interacting with the server 715 over the network 710. In this example, since the file system proxy 720 resides on the server 715, the file system proxy 720 intercepts file system operations once the server 715 has received the file system operation.

Figure 8:
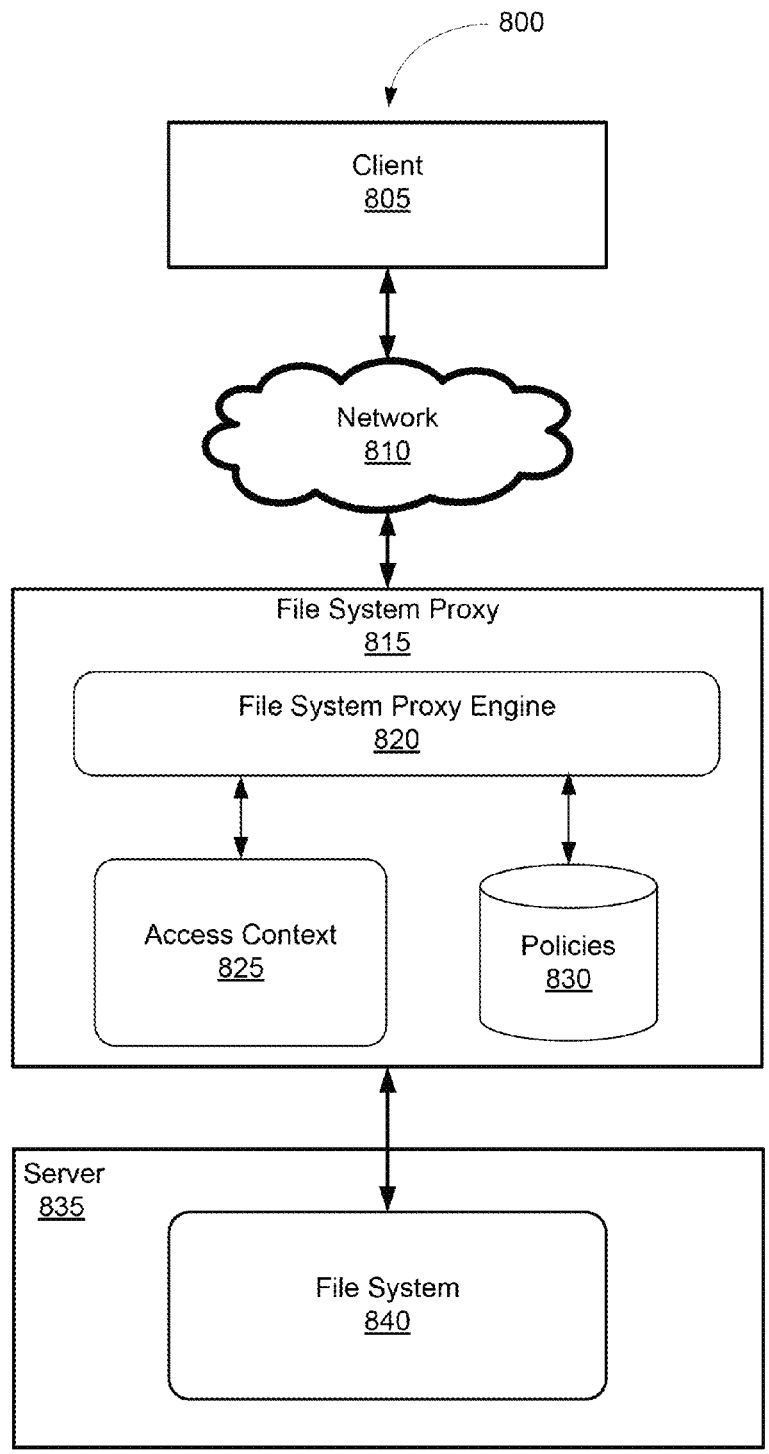
FIG. 8 is a diagram illustrating another example implementation of the present invention for a client and a server.

FIG. 8 is a diagram illustrating another example implementation of the present invention for a client and a server. Everything in FIG. 8 is similar to FIG. 7 except, the example implementation of FIG. 8 does not have the file system proxy 815 reside on the server 835. Rather, the file system proxy 815 intercepts file system operations before they reach the server 835. In such an example the file system proxy could reside on the network 810 as a device separate from the server 835, also referred to as the middle box.

For some implementations such as those illustrated in FIG. 7 and FIG. 8, the file system operations take the form of network packets that contain file system protocol semantics (e.g. NFS, CIFS, etc.). In such implementations, the control plane (110, 510, 720, 815) preserves the file system protocol as it perform control operations on the file system operation. In some embodiments, these protocols aid the control plane (110, 510, 720, 815) in maintaining file system sessions within the access context (520, 730, 825) for flow transformation and flow coordination purposes.

Figure 9:
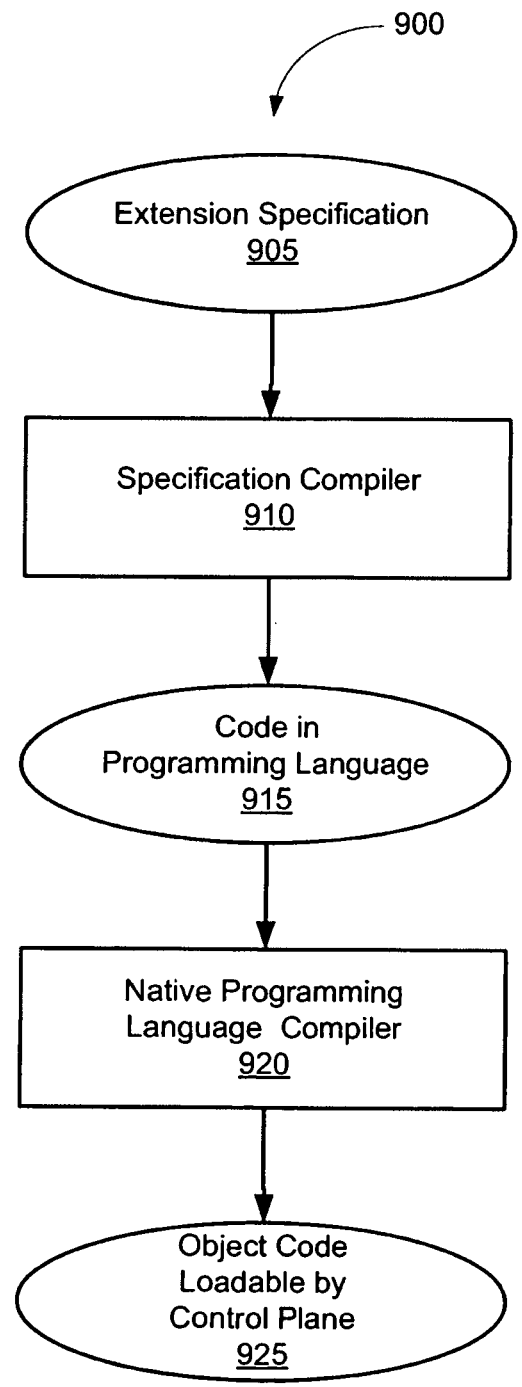
FIG. 9 is a flowchart illustrating an example of how an extension specification is compiled into object code that is executable by a control plane.

FIG. 9 is a flowchart illustrating an example of how an extension specification is compiled into object code that is executable by a control plane. The compilation 900 begins with an extension specification 905, which is compiled by the specification compiler 910. The specification compiler 910 translated the extensions specification 905 into native programming language 915, which can be compiled by a native programming language compiler 920. The native programming language compiler 920 outputs object code 925 that is loadable (invokable) by the control plane (110, 510, 615, 720, 815). In some embodiments, the extensions specification 905 is defined in a high-level abstract language which defines the extension handler invoked when a file system operation is received. The abstract language can be used to define the specific instruction sections of an extension (e.g. configuration, receiving, and sending).

Figure 10A:
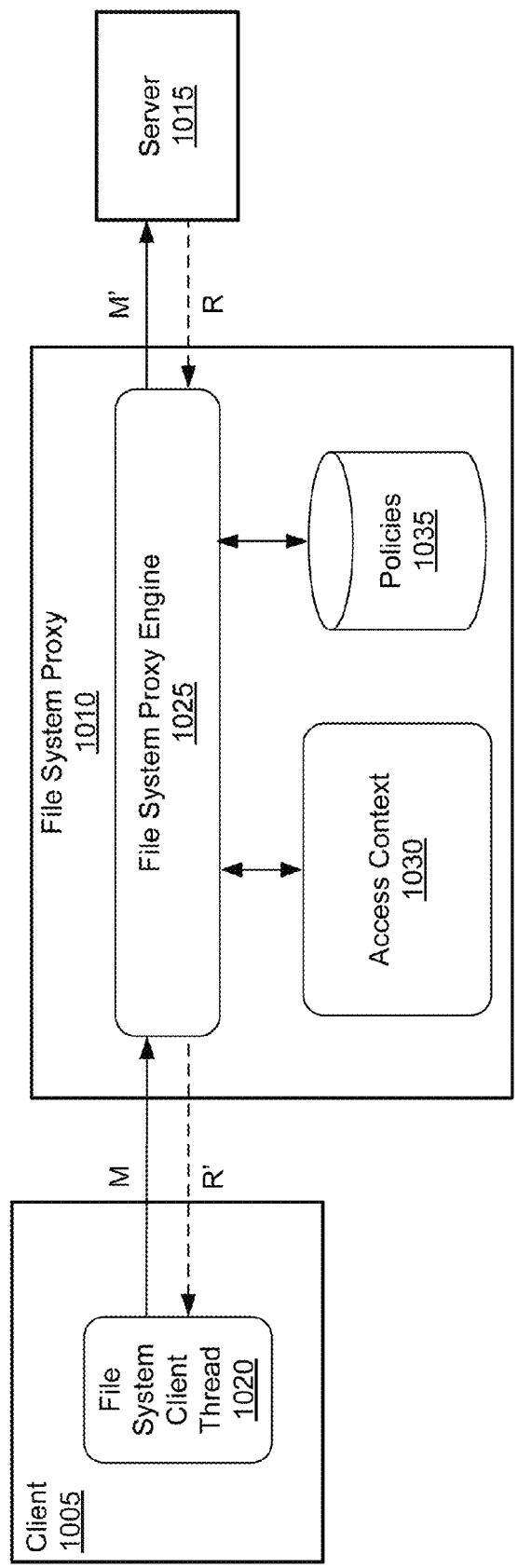
FIG. 10a is a diagram illustrating an example of how a file system proxy can perform a transformation operation between a client and a server.

FIG. 10*a* is a diagram illustrating an example of how a file system proxy can perform a transformation operation between a client and a server. FIG. 10*a* shows the flow of a user request message (M) from client 1005 and the response message (R) through the file system proxy 1010. The request is issued, by a file system client thread 1020 residing on the client 1005. This request (M) is issued through the standard file system interface. The file system proxy 1010 intercepts the operation, invokes policies 1035, and the policies 1035 are executed by the file system proxy engine 1025. The policies 1035 use the access context 1030 to transform the operation to M' and passes M' to the file system residing on the server 1015. The server 1015 returns a response (R), which is transformed by the file system proxy 1010 to R' and passed to the file system client thread 1020 as the file system response.

Figure 10B:
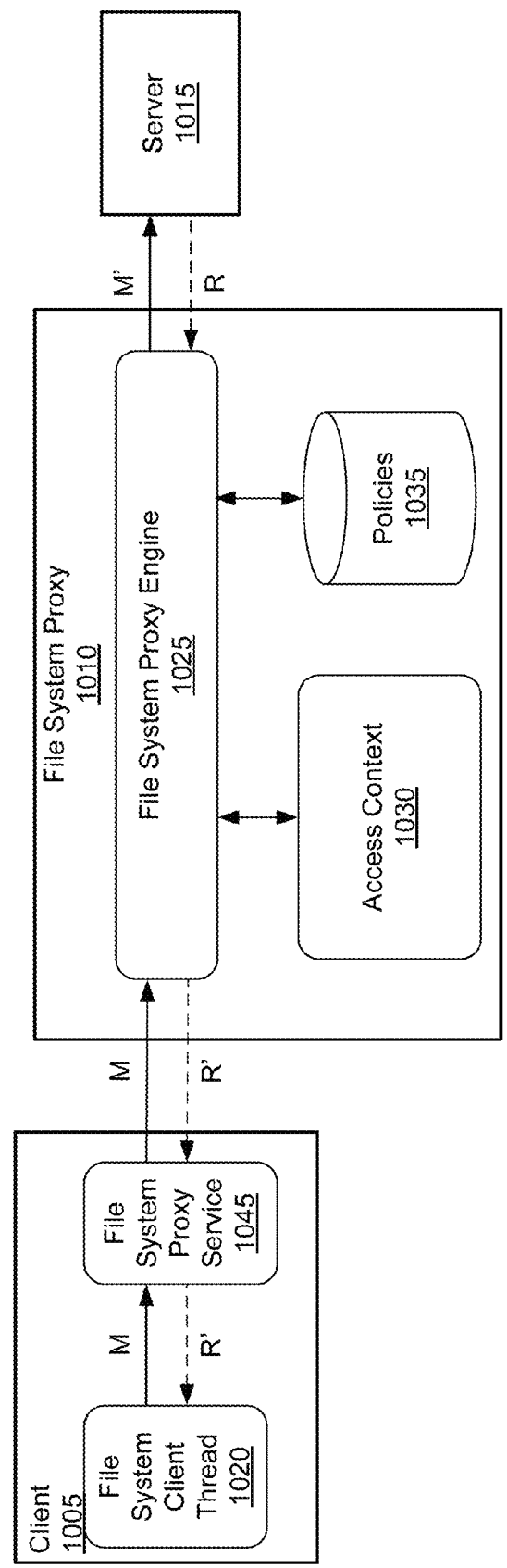
FIG. 10b is a diagram illustrating an example of how a file system proxy can perform a transformation operation between a client and a server where the client utilizes a file system proxy service.

FIG. 10*b* is similar to FIG. 10*a* except that the client 1005 utilizes a file system proxy service 1045 that resides on the client 1005 and is used to interface with the file system proxy 1010. In some embodiments, the file system proxy service 1045 sets up, maintains, and terminates file system sessions with the file system proxy 1010.

Figure 11:
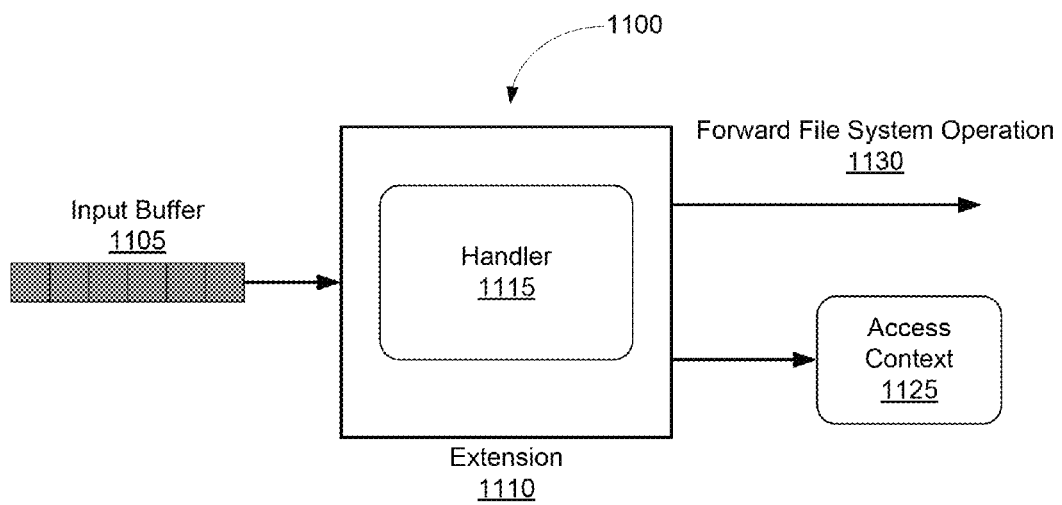
FIG. 11 is a diagram illustrating an example of how an extension interacts with an input buffer and an access context.

FIG. 11 is a diagram illustrating an example of how an extension interacts with an input buffer and an access context. The arrows represent the interaction of extension 1110 with the control plane (110, 510, 615, 720, 815). The control plane manages a fixed-sized input buffer 1105 for extension 1110. The control plane schedules (and thereby invokes) the extension 1110 by calling the extension's handler 1115 for a file system operation stored in the buffers 1105. An extension 1110 can interact with the control plane 110 either through reading from/writing to the access context 1125, by forwarding the file system operation 1130, discarding the file system operation, or creating a new message. When the file system operation is forwarded, the file system proxy 1010 can place the operation into the input buffer of the next extension in the chain.

Figure 12:
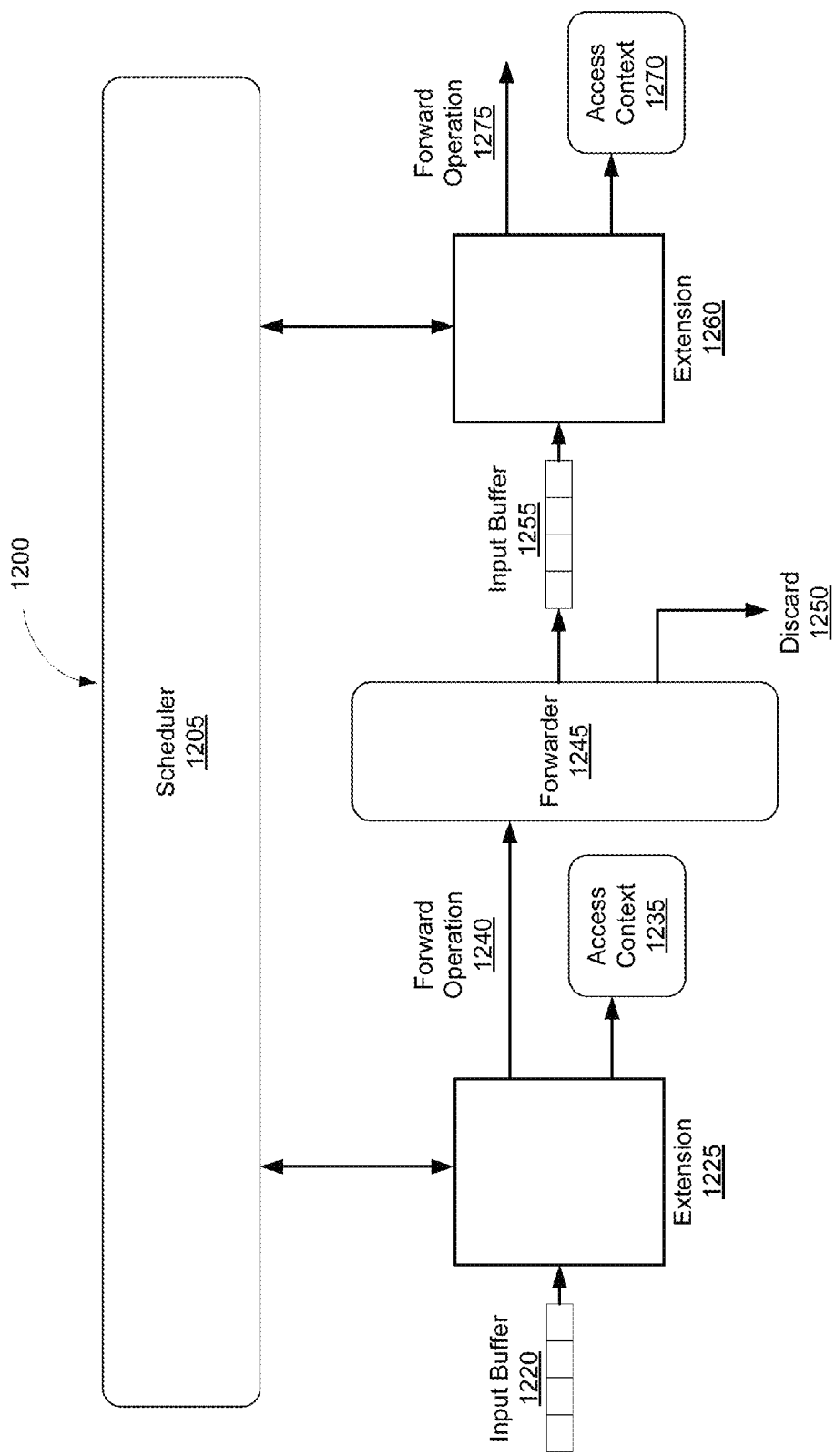
FIG. 12 is a diagram illustrating an example of how a scheduler and a forwarder interacts with extensions, enabling execution of chains of extensions.
Figure 13:
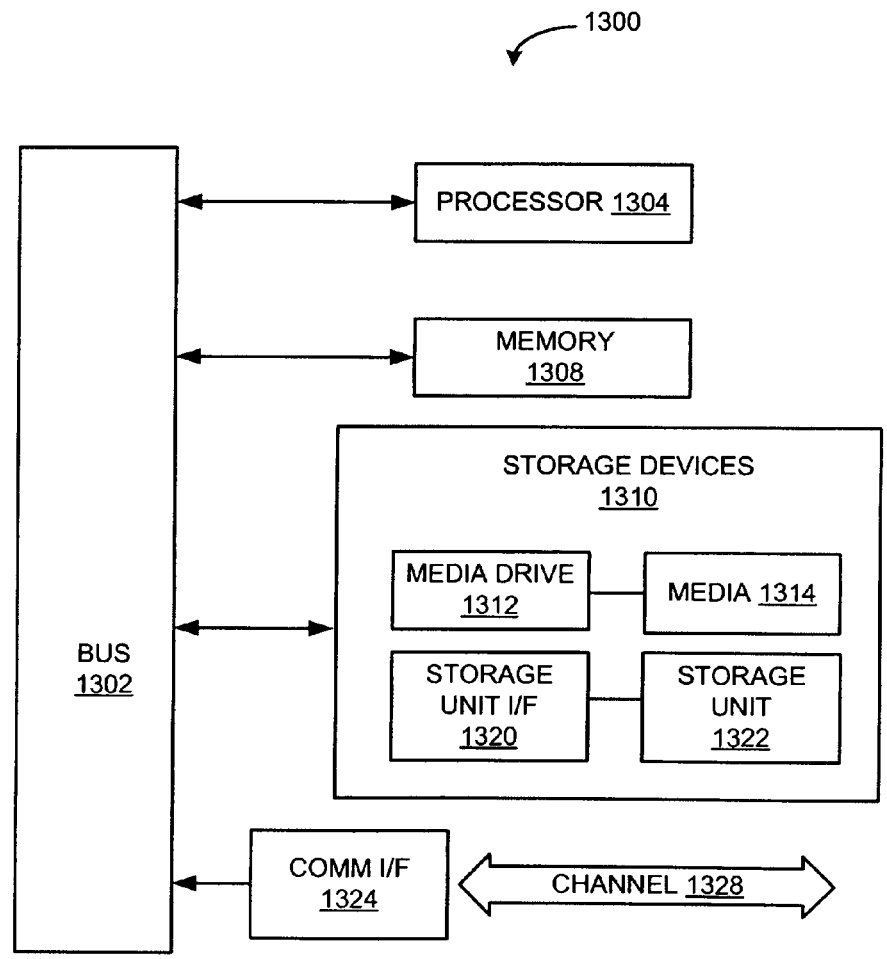
FIG. 13 is a diagram illustrating a computer system that can be used in conjunction with the systems and methods described herein.

FIG. 12 is a diagram illustrating an example of how a scheduler and a forwarder interact with extensions, enabling execution of chains of extensions. In some embodiments of the invention, the control plane (110, 510 615, 720, 815) has a scheduler 1205 and a forwarder 1245. The scheduler 1205 is tasked with scheduling (invoking) the extension (1225, 1260) based on a scheduling algorithm. In the case of extension chains, the extension 1260 is invoked after extension 1225 has forwarded the file system operation 1240. The forwarder 1245 enables an extension (1225, 1260) to return an unmodified, a transformed, or a newly created file system operation after processing. Subsequent to an extension's completion, the file system operation is either inputted into the next extension's input buffer (e.g. 1255), discarded (e.g. 1250) or forwarded out of the control plane by the forwarder 1245.

Where components or modules of the invention are implemented in whole or in part using software, in one embodiment, these software elements can be implemented to operate with a computing system capable of carrying out the functionality described with respect thereto. One such example computing system is shown in FIG. 13. Various embodiments are described in terms of this example computing system 1300. After reading this description, it will become apparent to a person skilled in the relevant art how to implement the invention using other computing systems or architectures.

Referring now to FIG. 13, computing system 1300 may represent, for example, desktop, laptop and notebook computers; hand-held computing devices (PDA's, smart phones, cell phones, palmtops, etc.); mainframes, supercomputers, workstations or servers; or any other type of special or general purpose computing devices as may be desirable or appropriate for a given application or environment. Computing system 1300 can also represent computing capabilities embedded within or otherwise available to a given device. Computing system 1300 can include one or more processors, such as a processor 1304. Processor 1304 can be implemented using a general-purpose or special-purpose processing engine such as, for example, a microprocessor, controller, or other control logic. In the example illustrated in FIG. 13, processor 1304 is connected to a bus 1302 or other communication medium to facilitate interaction with other components of computing system 1300.

Computing system 1300 can also include a main memory 1308, preferably random access memory (RAM) or other dynamic memory, for storing information and instructions to be executed by processor 1304. Main memory 1308 also may be used for storing temporary variables or other intermediate information during execution of instructions to be executed by processor 1304. Computing system 1300 can likewise includes a read only memory ("ROM") or other static storage device coupled to bus 1302 for storing static information and instructions for processor 1304.

The computing system 1300 can also include information storage mechanism 1310, which can include, for example, a media drive 1312 and a storage unit interface 1320. The media drive 1312 can include a drive or other mechanism to support fixed or removable storage media. For example, a hard disk drive, a floppy disk drive, a magnetic tape drive, an optical disk drive, a CD or DVD drive (R or RW), or other removable or fixed media drive. Storage media 1314 can include, for example, a hard disk, a floppy disk, magnetic tape, optical disk, a CD or DVD, or other fixed or removable medium that can be read by and written to by media drive 1312. As these examples illustrate, the storage media 1314 can include a computer usable storage medium having stored therein particular computer software or data.

In alternative embodiments, information storage mechanism 1310 may include other similar instrumentalities for allowing computer programs or other instructions or data to be loaded into computing system 1300. Such instrumentalities can include, for example, a fixed or removable storage unit 1322 and an interface 1320. Examples of such storage units 1322 and interfaces 1320 can include a program cartridge and cartridge interface, a removable memory (for example, a flash memory or other removable memory module) and memory slot, a PCMCIA slot and card, and other fixed or removable storage units 1322 and interfaces 1320 that allow software and data to be transferred from the storage unit 1322 to computing system 1300.

Computing system 1300 can also include a communications interface 1324. Communications interface 1324 can be used to allow software and data to be transferred between computing system 1300 and external devices. Examples of communications interface 1324 can include a modem or soft-modem, a network interface (such as an Ethernet, network interface card, or other interface), a communications port (such as for example, a USB port, IP port, RS232 port or other port), or other communications interface. Software and data transferred via communications interface 1324 are carried on signals, which can be electronic, electromagnetic, optical or other signals capable of being received by a given communications interface 1324. These signals can be provided to communications interface 1324 via a channel 1328. This channel 1328 can carry signals and can be implemented using a wired or wireless medium. Some examples of a channel can include a phone line, a cellular phone link, an RF link, an optical link, a network interface, a local or wide area network, and other communications channels.

In this document, the terms "computer program medium" and "computer usable medium" are used to generally refer to media such as, for example, memory 1308, storage unit 1322, media 1314, and signals on channel 1328. These and other various forms of computer usable media may be involved in carrying one or more sequences of one or more instructions to processor 1304 for execution. Such instructions, generally referred to as "computer program code" (which may be grouped in the form of computer programs or other groupings), when executed, enable the computing system 1300 to perform features or functions of the present invention as discussed herein.

While various embodiments of the present invention have been described above, it should be understood that they have been presented by way of example only, and not of limitation.

Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which each block is presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for controlling a file system, comprising:
intercepting a file system operation from a source, wherein a control plane intercepts the file system operation;
performing a control plane operation on the file system operation that transforms the file system operation to a processed file system operation, wherein the processed file system operation modifies the file system and wherein the control plane performs the control plane operation on the file system operation;
wherein the performing comprises:
analyzing the file system operation;
identifying an extension chain applicable to the file system operation, wherein the extension chain comprises a plurality of extensions connected in a chained sequence;
invoking and executing a first extension from the plurality of extensions;
passing the file system operation to the first extension;
performing the control plane operation on the file system operation according to the first extension; and
outputting the processed file system operation;
forwarding the processed file system operation to a destination, wherein the control plane determines the destination of the processed file system operation;
wherein the source and the destination exchange the file system operation through a data path;
wherein the source is a client, the destination is a file server, the control plane is a file system proxy, the data path is a network, and the file system proxy interposes between the client and the file server; and
wherein the file system operation comprises a network file system protocol and when the control plane performs the control plane operation on the file system operation, the network file system protocol is preserved.

2. The method of claim 1, wherein the source is a data plane user, the destination is a data plane, and the data plane user and data plane exchange the file system operation through a data path.

3. The method of claim 2, wherein the file system request originates from the data plane user and the file system response originates from the data plane.

4. The method of claim 1, wherein the file system operation is one of a file system request or a file system response.

5. The method of claim 1, wherein the control plane further invokes a next extension from the plurality of extensions, outputs the processed file system operation to the next extension, and performs another transformation on the processed file system according to the next extension.

6. The method of claim 1, wherein the control plane forwards the processed file system operation to the destination when a next extension does not exist in the plurality of extensions.

7. The method of claim 1, wherein the extensions determine a behavior of the control plane.

8. The method of claim 1, wherein the extensions have a definition comprising a plurality of configuration instructions, a plurality of receiving instructions, and a plurality of sending instructions.

9. The method of claim 1, wherein the control plane further performs the control plane operation on the file system operation according to a persistent state storage.

10. The method of claim 9, wherein the persistent state storage comprises
a static context wherein the static context stores a read-only state initialized by an extension, and
a dynamic context wherein the dynamic context stores a generated state and the generated state is updated by an extension during the control plane operation.

11. The method of claim 1, wherein the control plane further performs the control plane operation on the file system operation by executing an extension on a control plane engine.

12. The method of claim 1, wherein the file system operation comprises a first file system protocol and when the control plane performs the control plane operation on the file system operation, the first file system protocol is transformed to a second file system protocol.

13. The method of claim 1, wherein the source is a local file system user, the destination is a local file system, the data path is a virtual file system, and the control plane interposes between the local file system user and the local file system.

14. The method of claim 1, wherein the method is used for file system administration.

15. The method of claim 1, wherein the method is performed by a computer program product having computer readable program code functions embedded in a non-transitory computer useable medium.

16. A system for controlling a file system, comprising:
a data plane user;
a data plane;
a data path, wherein the data path is between the data plane user and the data plane and used to exchange a file system operation;
a computer system comprising a processor, a memory connected to the processor, and a non-transitory computer readable medium have instructions embedded therein, the instructions configured to cause the processor to operate a control plane, wherein the control plane interposes on the data path between the data plane user and the data plane, and wherein the control plane intercepts the file system operation from a source, performs a control plane operation upon the file system operation that transforms the file system operation to a processed file system operation that modifies the file system, and forwards the processed file system operation to a destination;
a plurality of extension chains, wherein the extension chains comprise a plurality of extensions connected in a chained sequence;
a persistent state storage, wherein the persistent state storage comprising a static context that stores a read-only state and a dynamic context that stores a generated state that is updated by the extensions;
a control plane engine, wherein the control plane engine invokes and executes the extensions, the extensions use the static and the generated state during execution, and the extension determines a behavior of the control plane;

wherein the data plane user is a client, the data plane is a file server, the control plane is a file system proxy, the data path is a network, and the file system proxy interposes between the client and the file server; and wherein the file system operation comprises a network file system protocol and when the control plane performs the control plane operation on the file system operation, the network file system protocol is preserved.

17. The system of claim 16, wherein the data plane user is a local file system user, the data plane is a local file system, and the data path is a virtual file system.

18. The system of claim 16, wherein the file system operation comprises a first file system protocol and when the control plane performs the control plane operation on the file system operation, the first file system protocol is transformed to a second file system protocol.

19. The system of claim 16, wherein the system is used for file system administration.

* * * * *